Feb. 26, 1924.  1,484,975
J. O. STUBBS
DECOY DUCK
Filed Feb. 27, 1923
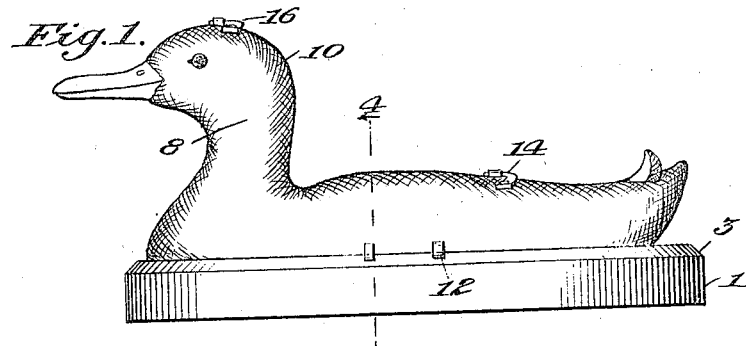
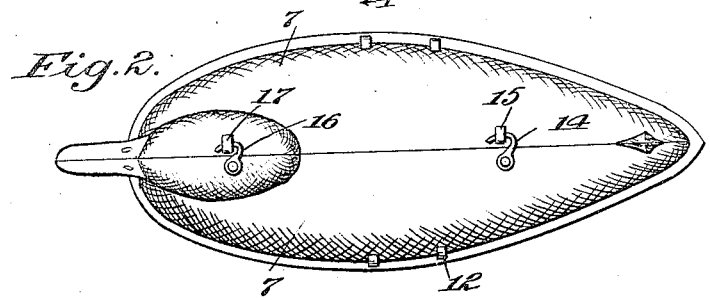
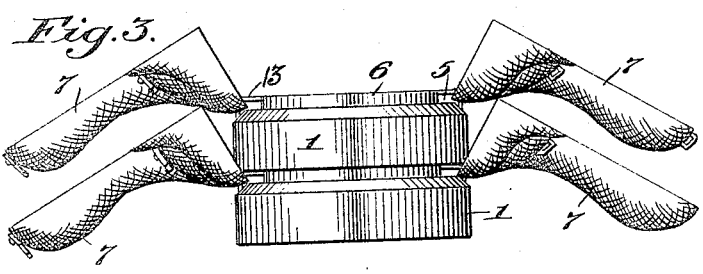
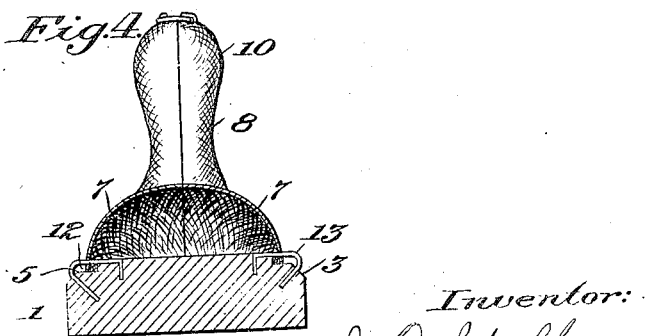
Inventor:
J. O. Stubbs,
by C. A. Mason Atty.

Patented Feb. 26, 1924.

1,484,975

UNITED STATES PATENT OFFICE.

JOHN O. STUBBS, OF HICKMAN, KENTUCKY.

DECOY DUCK.

Application filed February 27, 1923. Serial No. 621,498.

*To all whom it may concern:*

Be it known that I, JOHN O. STUBBS, citizen of the United States of America, residing at Hickman, in the county of Fulton and State of Kentucky, have invented certain new and useful Improvements in Decoy Ducks, of which the following is a full, clear, and exact description.

This invention relates to decoys, and more particularly to decoy ducks.

An important feature of the invention is comprised in a decoy in which the body portion is formed of two halves movably connected to a base, and the halves of the body are adapted to fold outwardly for stacking, or packing in a small space during transportation, or may be brought together to form a decoy which will resemble accurately a duck, or other water fowl.

The above, and other valuable features of the invention, including important details of construction and combinations of elements, will be better understood from the following description, when considered in connection with the accompanying drawings, in which:

Fig. 1 represents the decoy in side elevation;

Fig. 2 is a plan view;

Fig. 3 is an end elevation illustrating two of the decoys with the body and head portions opened, and in stacked relation, and Fig. 4 is a sectional view on the line 4—4, Fig. 1.

The decoy comprises a base 1, made of wood, or other suitable, buoyant material, and preferably having an outline in substantial accordance with the general outline of a duck, or other water fowl. The base 1 is preferably provided at its upper edge with a beveled portion 3, and is cut in or rabbeted at 5 around its upper edge to produce a raised portion 6, the outline of which follows that of the base.

The decoy is formed of two mating parts 7, 7, which are preferably stamped out of sheet metal and represent respectively one-half of the body, neck 8, and head 10, of a duck. Each of said parts is hinged along its side preferably by staples 12, to the base 1. These staples, in any suitable number, have their opposite ends driven into the base and provide between said ends looped portions 13, which are inserted through slots or openings near the lower edges of the parts 7, 7. One of the parts 7 is provided with hooks or latches 14, 16, which engage keepers 15, 17, in the other mating part, so that when the two parts of the decoy are brought together at their edges to form the complete duck, the latches may be engaged with the keepers so as to lock the parts, as shown in Figs. 1 and 2 of the drawings.

When it is desired to open and spread out the parts of the decoy in position for stacking during transportation, the latches 14, 16 are disengaged from their keepers and the two mating halves of the duck are swung outwardly so as to be extended or spread out, as in Fig. 3, where two of the decoys are illustrated in superposed relation. It will be obvious that any number of the decoys may be stacked upon each other when the mating halves are swung outwardly, and that said halves will substantially nest within each other so as to be very compact, and permit a number of the decoys to be packed in a relatively small space.

On the other hand, when it is desired to reassemble the decoys in position for use, the parts 7, 7 are turned on their hinges into closed or assembled relation, and the latches 14, 16, are engaged with their respective keepers 15, 17, thus maintaining the halves of the decoy in closed position, as long as desired.

When placed in the water, the base portion 1 will be found to be sufficiently buoyant to cause the decoy to float in a life-like manner. The decoy may be painted the appropriate colors to represent any species of duck or other water fowl, as desired, the illustrated species being shown by way of example only.

Changes may be made in the details of construction, and, within suitable limits, in the arrangement of the parts illustrated, without departing from the spirit of the invention.

What I claim as new and desire to secure by Letters Patent of the United States is:

1. A decoy comprising a base of buoyant material, and a body portion formed of mating halves of sheet material each in the form of one-half of the body and head of a fowl, said halves being directly hinged to said base and arranged to be separated and folded outwardly for transportation, or to be assembled in the form of the outline of a water fowl.

2. A decoy comprising a buoyant base having the general outline of a water fowl, and a body and head portion composed of mating halves, said halves being stamped out of sheet material, hinging means securing said halves directly to said base and permitting the halves to fold outwardly for transportation, and means for fastening said halves in closed position for use.

3. A decoy comprising a base of buoyant material having the general outline of a water fowl, said base provided with a recess extending around its upper edge, a body and head portion composed of two mating halves stamped out of sheet material, and made in the semblance of the body, neck and head of a water fowl, and arranged to fold outwardly for transportation, or to fold together to form the water fowl, the lower edges of said halves being hinged to the base and arranged to seat in the recess in said base.

In testimony whereof I have hereunto set my hand this 23d day of Feb'y, A. D. 1923.

JOHN O. STUBBS.